United States Patent [19]

Gordon

[11] Patent Number: 4,828,039
[45] Date of Patent: May 9, 1989

[54] HARVESTING APPARATUS

[75] Inventor: Dale Gordon, Lemoore, Calif.

[73] Assignee: Basic American Foods, San Francisco, Calif.

[21] Appl. No.: 774,439

[22] Filed: Sep. 10, 1985

[51] Int. Cl.⁴ ............................................. A01D 25/04
[52] U.S. Cl. ...................................... 171/10; 171/58; 171/124
[58] Field of Search ................... 171/10, 58, 68, 103, 171/112, 115, 95, 98, 116, 124, 125; 172/33, 51, 52, 57, 59, 63, 68, 149, 151, 166, 187, 184, 190, 191

[56] References Cited

U.S. PATENT DOCUMENTS

| | | | |
|---|---|---|---|
| 626,360 | 6/1899 | Baldwin | 171/68 X |
| 804,631 | 11/1905 | Smart | 172/522 |
| 1,155,319 | 9/1915 | Moller et al. | 171/10 |
| 1,170,692 | 2/1916 | Smith et al. | 171/10 X |
| 1,690,009 | 10/1928 | Hamilton | 171/68 X |
| 1,906,139 | 4/1933 | Denstädt et al. | 111/2 |
| 2,369,723 | 2/1945 | Denlinger | 171/123 X |
| 3,127,724 | 4/1964 | Fraresso et al. | 56/14.5 |
| 3,144,910 | 8/1964 | Hawkins et al. | 171/58 |
| 3,419,084 | 12/1968 | Barrows et al. | 171/58 |
| 3,425,494 | 2/1969 | Parrish | 171/58 |
| 3,454,099 | 7/1969 | Wells | 171/58 |
| 3,654,997 | 4/1972 | Partyanko et al. | 171/58 |
| 4,024,920 | 5/1977 | Haverdink | 171/58 |

FOREIGN PATENT DOCUMENTS

| | | | |
|---|---|---|---|
| 645635 | 10/1928 | France | 171/58 |
| 1269771 | 7/1961 | France | 172/166 |
| 1480643 | 4/1967 | France | 111/88 |
| 2304269 | 11/1976 | France | 171/58 |
| 2340679 | 10/1977 | France | 171/10 |
| 129889 | 11/1959 | U.S.S.R. | 171/58 |
| 429772 | 10/1974 | U.S.S.R. | 171/124 |
| 670268 | 6/1979 | U.S.S.R. | 171/58 |

Primary Examiner—Richard J. Johnson
Attorney, Agent, or Firm—Sandler & Greenblum

[57] ABSTRACT

A vegetable digger is provided for furrowing vegetables from the earth and for removing the vegetables from the earth and thereafter depositing them above the ground. The digger includes a frame having a front, opposed first and second sides, a rear and a plurality of wheels. One furrowing disk is provided which will loosen the dirt in the furrowed sections of the ground when the digger moves in a predetermined forward direction. At least one earth moving disk is provided for moving the loosened dirt away from the vegetables, and at least one unearthing disk for raising the vegetable bulbs towards the top of the ground. At least one transfer disk is provided for conducting the bulbs from the dirt and into the conveyor. A method is also provided for using the apparatus to remove bulbs which are buried in the ground and then deposit them back onto the ground so that they can be picked up by a trailing harvesting machine which will separate them into market-grade and process-grade vegetable bulbs. The apparatus is particularly useful in conjunction with the harvesting of garlic bulbs.

15 Claims, 4 Drawing Sheets

HARVESTING APPARATUS

DESCRIPTION OF THE INVENTION

1. Field of the Invention

The present invention generally relates to a vegetable digger, and more particularly to a vegetable digger for digging garlic bulbs from furrows by loosening the furrow, separating dirt loosened from the furrow away from vegetables within the furrow, unearthing the vegetables from the furrows, and thereafter transferring the thus separated vegetables onto a movable frame. The vegetables are then deposited onto the ground as the digger moves forward.

2. Description of Prior Art

There have been a variety of different apparatus and devices for harvesting a variety of vegetables.

BALDWIN, U.S. Pat. No. 626,360, discloses a harvester which is particularly adapted for digging potatoes. In this harvester, the width of land slices cut by the digger can be easily regulated. A plurality of disks are provided which when moving forwardly can cut land slices and throw soil and vegetables contained in the soil into a revolving screen through which soil passes to result in a relatively clean agricultural product.

SMART, U.S. Pat. No. 804,631, discloses a harvesting apparatus which is particularly adapted for removing beets or other tubers from the soil. A plow includes adjustable disks whose rotation raises vegetables from the ground and leaves them on the surface, cutting off vines and weeds as the disks are progressively moved along the rows of beets to excavate them from the soil. The disks, by virtue of their progressive and rotary motion, together serve as scoops which raise the beets to the surface of the soil and which will not injure the beets as they are raised.

MOLLER et al., U.S. Pat. No. 1,155,319, disclose a harvesting apparatus which is particularly suitable for digging beets. This apparatus includes a device for cutting a furrow on each side of a row of beets, and also includes a device for lifting the beets from the ground and dropping them substantially free of dirt. The machine is provided with disks 22 which are suitably inclined to cut parallel grooves or ditches in the surface of the ground. A plurality of following rollers are provided which travel within the furrows which are cut and which engage exposed beets throwing them upwardly so that when they drop gently onto the ground dirt will be removed therefrom.

FRARESSO et al., U.S. Pat. No. 3,127,764, disclose a harvester and more particularly a cutter-windrower which harvests a variety of legumes. The machine has a row of cutter blades which are transversely arranged with respect to the soil furrows. It also includes a pair of diverging rim portions which contact disks arranged behind each cutter blade, as well as means for driving the disks so as to raise the harvested products upwardly and thereafter deposit them on the soil in order to define rows of harvested plants. An endless conveyor belt is also provided behind the pairs of disks which is adapted to collect rows of harvested plants and convey them to an appropriate receptacle. An inclined endless conveyor having a width equal to that of two cutter blades is located behind the cutter blades and associated disks. The upper end of the first endless conveyor terminates above a second endless conveyor, in a perpendicular fashion, and is adapted to discharge the harvested product into a row to the sides of the path of the harvesting machine as it moves forwardly.

BARROWS et al., U.S. Pat. No. 3,419,084, disclose a multi-row digging assembly for root crops in which a pair of wheels or disks are arranged to dig the crop in separate hills, each pair of wheels straddling the center line of the crop row.

WELLS, U.S. Pat. No. 3,454,099, discloses a row crop harvester having cross-digging wheels with adjustable mounts. The adjustable mounts are provided to adjust the wheels from a position for harvesting upright plants into a second position in which they are better able to harvest plants which grow at an inclination to the vertical.

PARTYANKO et al., U.S. Pat. No. 3,654,997, disclose a root harvester having separating tools for enhancing the cleaning of dirt and vegetable trash and debris from the crop. The device includes rotating disks in the form of dig-up tools which are followed by a beater feeder which delivers the crop together with dirt and trash onto separate tools for separating the same.

HAVERDINK, U.S. Pat. No. 4,024,920, discloses an agricultural harvester for root crops. This device can remove dirt and other debris collected along with the root crop during the harvesting operation. This harvester includes a digger which comprises a wheel assembly including a pair of lifter wheels. Directly after the digger wheels is a first conveyor which is positioned to receive the harvested crop from the digger wheel assembly and to convey the same upwardly and rearwardly. A second conveyor is positioned rearwardly of the first conveyor and receives the crop for transporting it to another elevator-type conveyor and ultimately to a truck for transporting the harvested crop to storage.

All of these devices merely show that it is known in the art to use disks to dig out root-type row crops as well as to provide conveyors for transporting an unearthed product into a suitable receptacle. None, however, disclose a particular arrangement of disks as in the present invention, nor achieve the advantages of loosening dirt, removing the dirt from a root crop and thereafter removing the root crop from the soil and conveying it away from the digging device as in the present invention.

SUMMARY OF THE INVENTION

It is a general object of the present invention to provide a new and improved garlic digger which easily cuts a plurality of furrows in vegetable-laden soil, moves a section of the furrow away from the garlic bulbs or other vegetables, unearths the bulbs, and thereafter transfers the bulbs onto a frame, thereafter depositing the bulbs onto the top of the just-plowed surface.

It is another object of the present invention to unearth a plurality of vegetables such as garlic bulbs from their position within furrows and deposit them back on top of the furrows so that they can be easily picked up by a garlic bulb sorting mechanism, such as that disclosed in commonly assigned United States Patent Application Ser. No. 774,438, filed on even date herewith, and entitled "VEGETABLE HARVESTER".

Still another object of the present invention is to provide a new and improved garlic bulb digger which includes a plurality of rotating disks which are capable of cutting furrows in the ground, removing garlic bulbs and other vegetables from the ground without unduly damaging them, and thereafter transferring such vegetables onto the framework of the garlic digger for deposit back onto the ground after the garlic digger has passed the area which has been cut so that they can be picked up by a garlic bulb harvesting machine.

The present invention is provided for in a first aspect thereof by a vegetable digger for removing vegetables from the ground. The vegetable digger comprises a framework having a front, opposed first and second sides, a rear, and a plurality of wheels. The digger further comprises at least one furrowing disk, each at least one furrowing disk comprising means for loosening the dirt in furrow sections of the ground as the digger moves in a predetermined direction forwardly. The digger further comprises at least one earth moving disk for moving dirt loosened by said at least one furrowing disk away from vegetables within said ground. The digger further comprises at least one unearthing disk for uplifting vegetable bulbs from the loosened dirt after the at least one earth moving disk has moved the vegetables away from the dirt and at least one transfer disk for conducting the bulbs from the dirt and into the framework.

The vegetable digger is adapted to uproot garlic bulbs from the ground. The framework includes means for conducting the uplifted vegetable bulbs from the at least one transfer disk back toward the rear of the framework to be deposited onto the ground and means for separating substantially all of the dirt from the vegetables. The at least one transfer disk is positioned adjacent to at least one pick-up conveyor, the at least one pick-up conveyor comprises means for transporting the vegetables towards the rear of framework. The framework is generally horizontal with respect to the ground and the framework front comprises a bar which is generally perpendicular to the direction of forward movement.

Each furrowing disk and each earth moving disk are adjustable attached both vertically and laterally to the front bar. The framework sides comprise generally parallel bars which are generally perpendicular to the front bar and generally parallel to the direction of movement.

The furrowing disk is positioned forwardly of the earth moving disk, as viewed with respect to the direction of forward movement. The furrowing disk and the earth moving disks are substantially angled with respect to a central axis of the framework and with respect to the parallel side bars.

The vegetable digger includes two earth moving disks and the unearthing disk is positioned along an axis which intersects the angle formed by the two earth moving disks. The two earth moving disks are positioned along at a generally acute angle.

All of the disks in the digger have corresponding central hubs and are generally frustoconical. The at least one furrowing disk, the at least one earth moving disk, and the at least one unearthing disk are positioned generally vertically. The at least one furrowing disk and the at least one earth moving disk are freely rotatable as the digger traverses the ground and wherein the at least one unearthing disk and the at least one transfer disk are driven by pneumatic motors. The transfer disk is substantially horizontal and is located generally transverse with respect to the unearthing disk and is positioned adjacent the unearthing disk. Each of the generally vertical disks rotate in a substantially vertical plane about the corresponding central hub as the framework is moved in the predetermined direction, the transfer disk is rotatable about the corresponding central hub in a substantially horizontal plane.

The vegetable digger further comprises at least one pick-up conveyor having a first end and a second end, the pick-up conveyor being generally angled upwardly from the first end toward the second end. The second end is positioned adjacent the rear of the framework, and the first end is positioned directly adjacent to the transfer disk.

The vegetable digger further comprises a transport conveyor positioned adjacent the second end of the pick-up conveyor and adjacent the rear of the framework. The transport conveyor has a central portion which is substantially horizontal and two end portions adjacent respective sides of the framework which are angled generally downwardly.

The pick-up conveyor is a chain-link conveyor, the chains are spaced from one another by a sufficient distance to permit dirt and debris to fall between the chains onto the ground as the framework moves in the predetermined direction while retaining the vegetables thereon.

The invention is provided for in a second aspect thereof by a method of harvesting and unearthing vegetable bulbs comprising the steps of moving a wheeled framework, having a front portion and a rear portion, over the ground in which the vegetables are located, using a plurality of disks located in the front portion of the framework to remove the bulbs from the ground, and depositing the removed bulbs from the rear portion of the framework back onto the ground after the framework has traversed a given portion of the ground. The method further comprises the step of using a plurality of conveyors to move the removed bulbs from the front of the framework back onto the ground after the framework has traversed a given portion of the ground.

The step of using a plurality of disks comprises making an initial cut in a furrow section of the ground using a first, generally vertical disk. The step of using a plurality of disks further comprises loosening the bulbs and surrounding dirt using at least two second generally vertical, disks positioned on either side and to the rear of the first disk. The step of using a plurality of disks further comprises the step of lifting the bulbs from the ground using a third, generally vertical, disk positioned between and to the rear of the at least two second disks. The step of using a plurality of disks further comprises the step of depositing the lifted bulbs onto a fourth generally horizontal, pneumatically driven, disk positioned adjacent to the third disk. The step of using a plurality of disks further comprises the step of rotating the fourth disk so that the bulbs are deposited onto a first conveyor of the at least one conveyor.

The step of using a plurality of conveyors comprises the step of transporting the deposited bulbs from the front of the framework via the first conveyor to a second conveyor in the plurality of conveyors disposed generally perpendicularly with respect to said first conveyor. The step of using a plurality of conveyors further comprises the step of depositing the bulbs onto the ground from the second conveyors.

The above and other objects, features and advantages of the present invention will be more fully described in the remaining portion of the specification.

BRIEF DESCRIPTION OF THE DRAWINGS

The above and other objects, features and advantages of the present invention will become more fully apparent to those of ordinary skill in the art to which this invention pertains from the following detailed description, when taken in conjunction with the accompanying drawings, wherein similar reference numerals are used throughout to describe similar parts, and wherein.

DETAILED DESCRIPTION OF THE DRAWINGS

Figure 1:
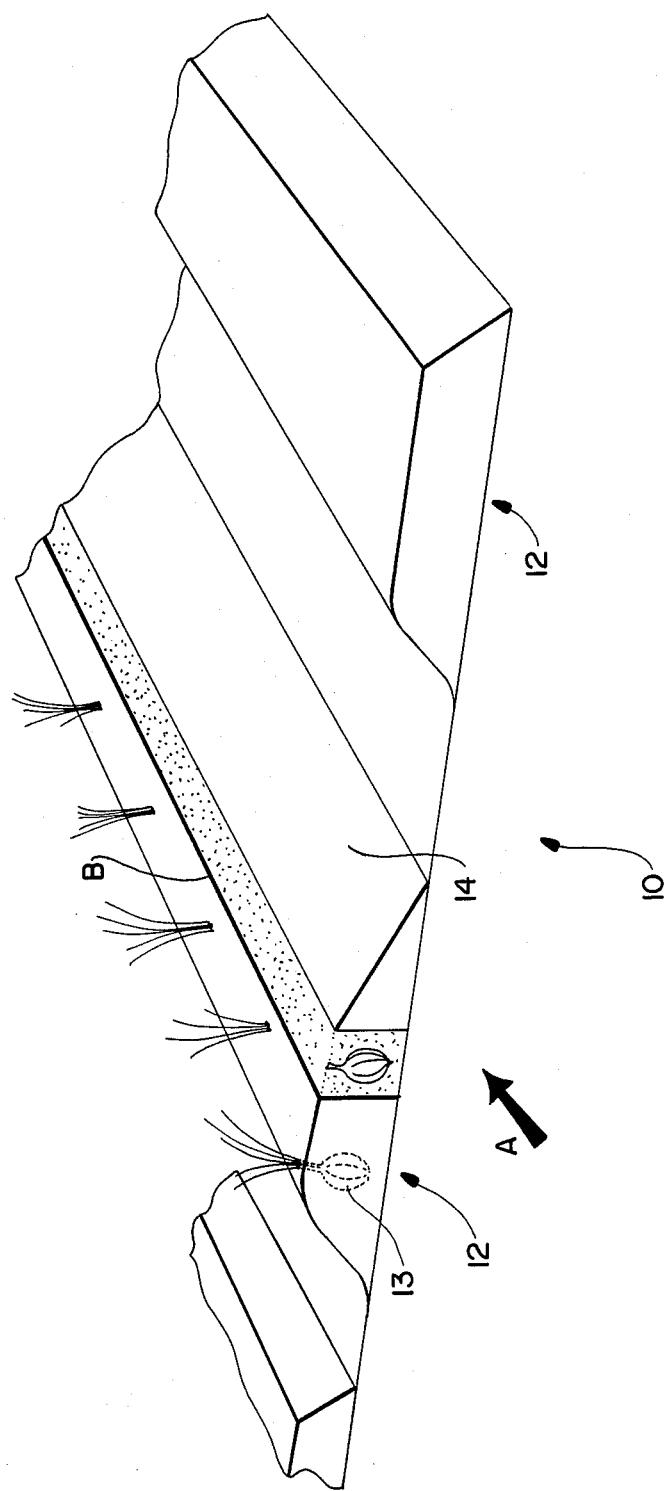
FIG. 1 illustrates the furrows in a field which is laden with bulb-type vegetables, e.g., garlic and/or potatoes.

Referring more specifically to the drawings, FIG. 1 illustrates a field about to be plowed by the apparatus. This field 10 has a plurality of furrows or rows 12 with dirt 14 and rows of aligned garlic bulbs or other tubers 13 positioned therein. The dirt in this ground is to be separated from the bulbs to be harvested by the present invention.

Figure 2:
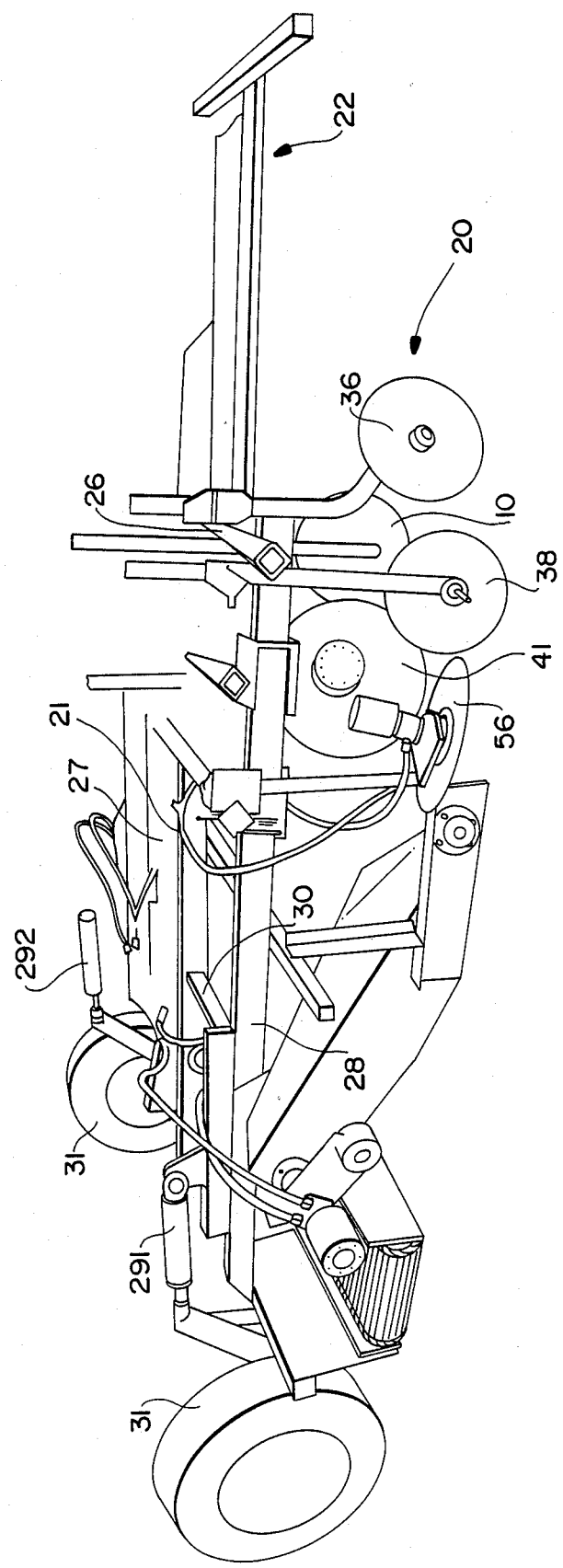
FIG. 2 is an overall perspective view of the vegetable digger of the present invention.

FIG. 2 is a perspective view of the overall apparatus of the present invention. As can be seen from FIG. 2, garlic or other vegetable digger 20 includes a forward, generally T-shaped hitch 22 which is adapted to be attached to a tractor or other driving vehicle. The digger includes a generally rectangular framework 24 having a front bar 26 which is generally parallel to the earth on which the digger is operating, two opposed side bars 27, 28, and a rear bar 30. These bars all generally lie in the same plane, and the two side bars are substantially parallel to each other and generally transverse to the front bar and the rear bar. As shown in the drawings, all of the bars are generally rectangular members formed from wrought iron; but they could equally well be any other structural material such as wood or durable plastic. The digger has a pair of rear wheels 31 to which shock absorbers 291 and 292 are attached. These shock absorbers form part of the overal suspension system for the device.

Figure 3:
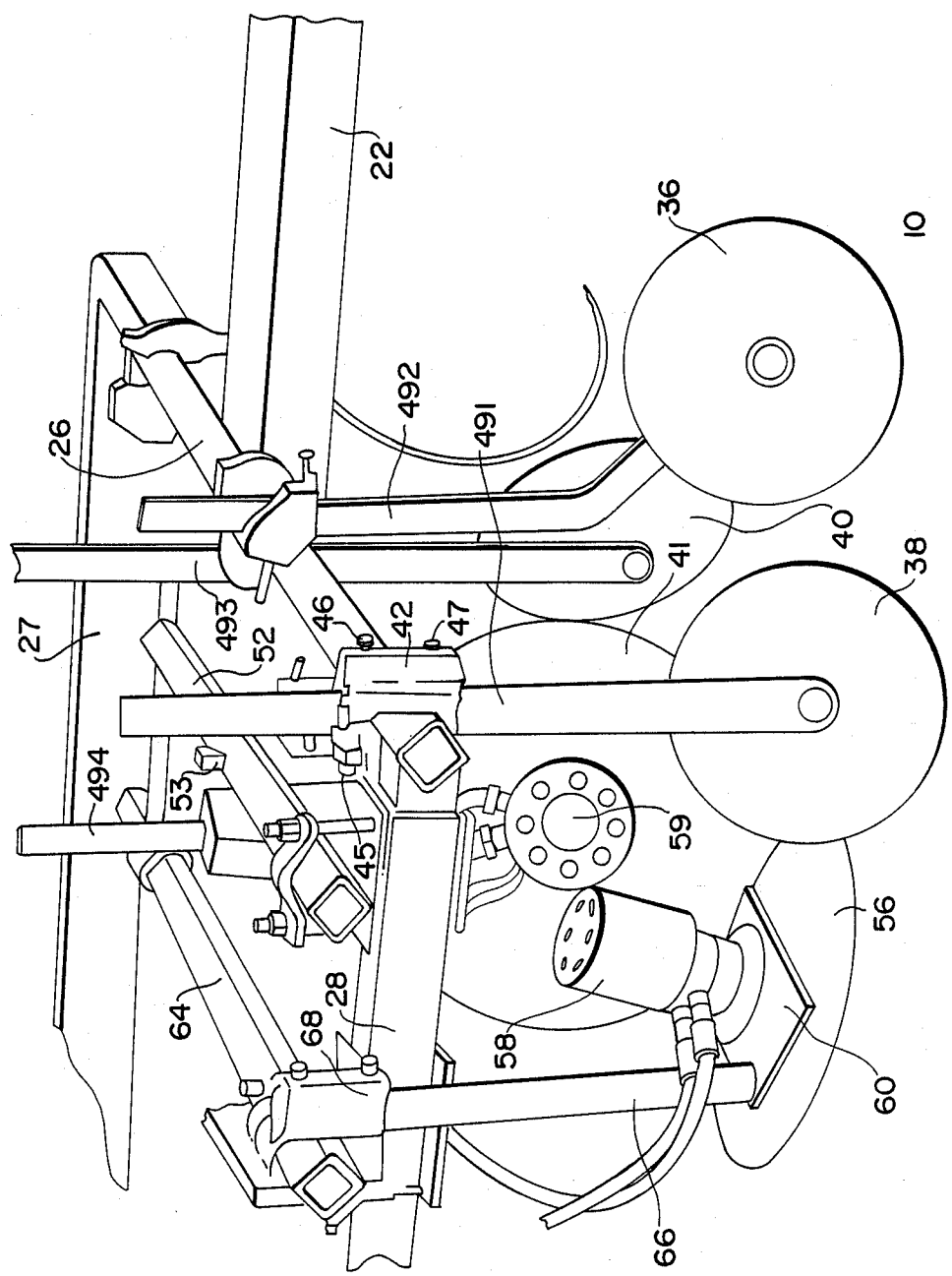
FIG. 3 is a perspective view of the front frame portion of the present invention.

As best illustrated in FIG. 3, adjacent the front bar a plurality of cutting disks are attached to the generally rectangular framework. The disks are all preferably frustoconical, and have their frustoconical portions working on ground 10. Each of the disks has a corresponding central hub about which it rotates. The forwardmost disk is furrowing disk 36 which is generally frustoconical in shape; it is positioned generally vertically with respect to the ground. The plane containing the disc cutting edge at which it is aligned is generally parallel to the longitudinal axis of the digger, and generally parallel to the forward direction of movement of the digger. This is best illustrated in FIG. 3.

At least one earth moving disk 38 is also provided and is also attached to front bar 26, as is furrowing disk 36. As shown in FIG. 3, all of these disks are positioned to one side of the T-hitch; however, a second assembly could be provided on the other T-hitch, and dependent upon the length of the front bar, any desired plurality of assemblies could be provided. Each of the earth moving disks as illustrated in FIG. 3 is positioned along one side of the plane of furrowing disk 36, and earth moving disks 38 and 40 are positioned at an acute angle with respect to each other so as to form an imaginary angle which is intersected by the plane along which disk 36 is positioned.

All of these disks are adjustably positioned on front bar 26 by conventional clamping elements 42, which have loosenable nuts 44 and bolts 45 to permit the clamp to be moved laterally along front bar 26. This moves each disk in a generally horizontal fashion. Additionally, by loosening bolt 46 and nut 47, generally vertically bars 491, 492, 493 and 494 to which each of the furrowing and earth moving disks are attached, can be moved generally vertically to adjust the height of these disks to a desired level. It will be necessary to adjust the vertical height of these disks dependent upon the depth to which cuts must be made in the ground; and to adjust for particularly hilly or nonuniform sections of ground. Each of the disks 36, 38 and 40 are positioned so that they touch the ground and are rotated when digger 20 is moved along the ground.

Positioned rearwardly of earth moving disks 38 and 40 is one unearthing disk 41 which is substantially larger than earth moving disks 38 and 40 and which is positioned on intermediate bar 52 which connects the side bars. Intermediate bar 52 is positioned atop side bars 27 and 28 and is substantially parallel to front bar 26. Unearthing disk 41 also is clamped to intermediate bar 52 by clamping member 53, which is substantially identical to clamping members 42 and which clamps furrowing disk 36 and each of earth moving disks 38 and 40 to front bar 26. It is substantially larger than disks 36, 38 and 40 and is positioned along an axis which is located generally between the rear portions of the two earth moving disks 38 and 40. Unearthing disk 41 is pneumatically or hydraulically driven by hydraulic or pneumatic motor 59 in a conventional manner.

Positioned directly adjacent to unearthing disk 41, and beneath it, in a substantially horizontal fashion is final, bulb transfer disk 56. While furrowing disk 36, earth moving disks 38 and 40 all rotate by virtue of forward or rearward movement of digger 20, which is towed by a vehicle (unreferenced), bulb transfer disk 56 rotates by virtue of hydraulic or pneumatic motor 58 (of conventional configuration and operation), as best shown in FIG. 3. Disk 56 is retained by plate 60 along its upper surface, which is in turn held to second intermediate bar 64 by generally vertically positioned support bar 66. Support bar 66 is retained by clamping member 68 which is again virtually identical to the other clamping members, and which is adapted to provide adjustable vertical and lateral movement for transfer disk 56 along second intermediate bar 64.

Figure 4:
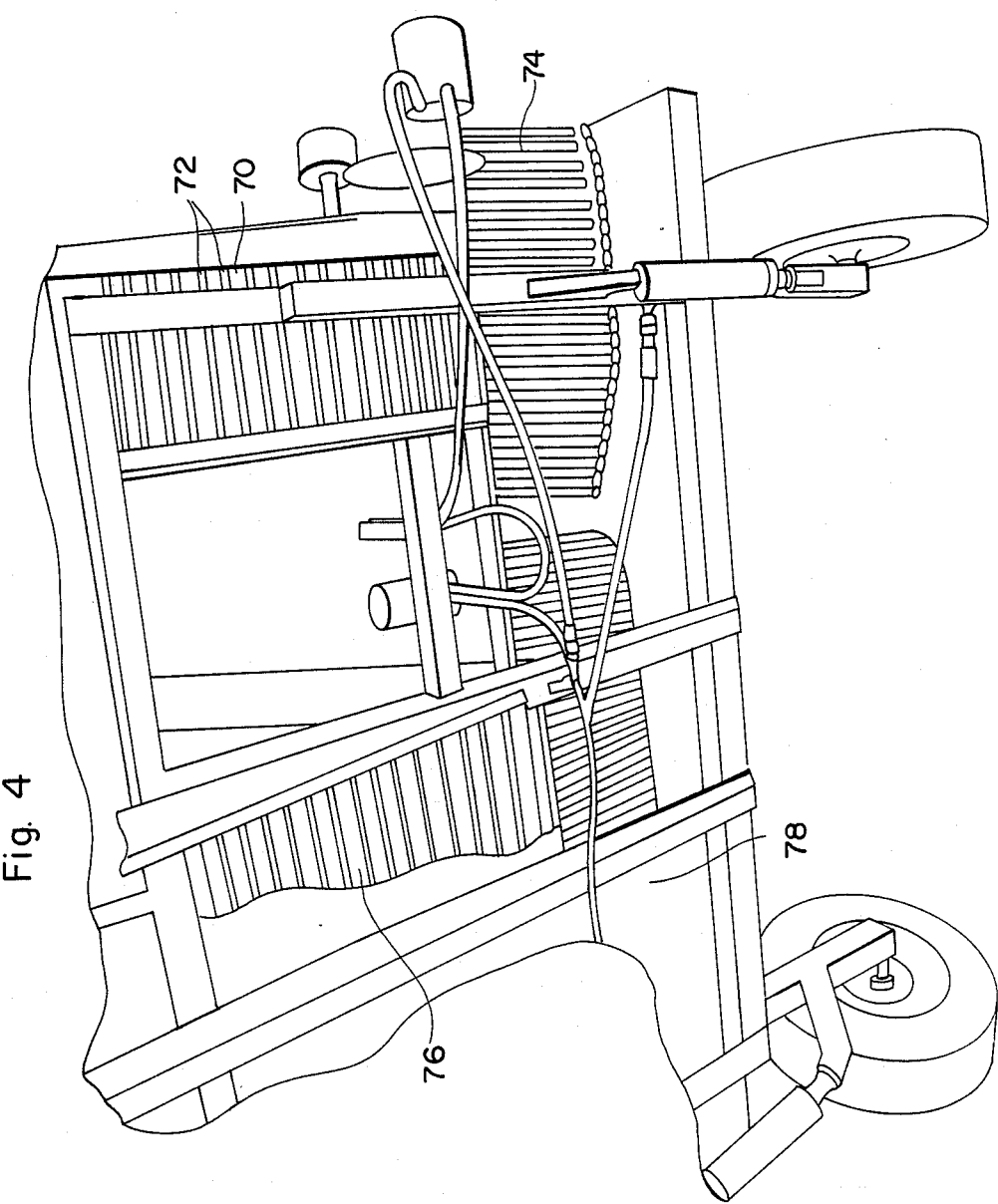
FIG. 4 is a perspective view of the rear portion of the digger of FIG. 1.
Figure 5:
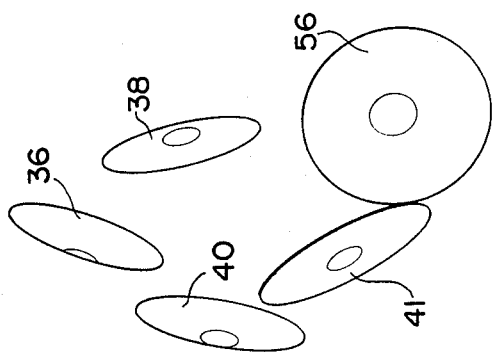

Two conveyors are also provided as best illustrated in FIG. 4. First pick-up conveyor 70 conveys bulbs upwardly away from transfer disk 56 and towards the rear of the vehicle. Pick-up conveyor 70 extends substantially along the length of framework 24 and is generally angled upwardly from the first, front end of conveyor 70 toward the second, rear end. The front end of conveyor 70 is positioned directly adjacent transfer disk 56 for receiving the bulbs and conveying them towards the rear of framework 24. Pick-up conveyor is a chain-link conveyor, which consists of a plurality of chains 72. Chains 72 are spaced apart from one another by a sufficient distance to permit dirt and debris to fall between the chains onto the ground as digger 20 traverses the ground. Additionally, chains 72 are close enough to retain the vegetables on conveyor 70.

Extending along the rear of framework 24, in a direction substantially perpendicular to pick-up conveyor 70, is transport conveyor 74. Transport conveyor 74 is a chain-link conveyor similar to that of pick-up conveyor 70. Transport conveyor 74 includes a substantially horizontal central portion and two end portions, adjacent to each side of digger 20, which are angled generally downward in order to deposit the bulb back onto the furrows as digger 20 traverses the field. As illustrated in FIG. 4, second pick-up conveyor 76 and second transport conveyor 78 must be included in digger 20 in the event that a second assembly of disks are provided on the other side of T-shaped hitch 22, as discussed above.

The operation of digger 20, in accordance with the preferred embodiment is as follows. Digger 20 traverses the field in a direction that is substantially parallel to the furrows as shown by arrow A in FIG. 1. Furrowing disk 36 makes the first cut in the furrow along line B in FIG. 1. Furrowing disk 36 and earth moving disks 38 and 40 are positioned generally vertically and rotate in the direction of movement of digger 20 as digger 20 traverses ground 10. Earth moving disks 38 and 40, using the frustoconical surface of the disks, loosen the dirt and bulbs on either side of line B in FIG. 1.

Unearthing disk 41, driven by hydraulic or pneumatic motor 59, removes the bulbs and dirt from ground 10 using the concave surface of disk 41. The bulbs and dirt are deposited on the concave surface of bulb transfer disk 56. Bulb transfer disk 56, driven by hydraulic or pneumatic motor 58, deposits the bulbs and dirt onto pick-up conveyor 70. The dirt falls through chains 72 back onto the ground, while the bulbs are conveyed towards the rear of framework 24. The bulbs are then transferred onto the central portion of transport conveyor 74. The end portion, angled generally downward, deposits the bulbs onto the top of ground 10 for removal by a garlic bulb sorting mechanism such as that disclosed in the above-noted copending patent application.

From the above description it is clear that one of ordinary skill in the art could easily ascertain the essential characteristics of this invention, and without departing from the spirit and scope thereof, could make various changes and modifications of the invention to adapt it to various usages and conditions.

What is claimed is:

1. A vegetable digger for removing vegetables from the ground, said vegetable digger comprising:
   (a) a framework with a generally horizontal longitudinal axis and having a front, opposed first and second sides, a rear, and a plurality of wheels;
   (b) at least one generally vertical furrowing disk, concave-convex each at least one furrowing disk comprising means for loosening the dirt in furrow sections of said ground as said digger moves in a predetermined direction forwardly;
   (c) at least one generally vertical earth moving disk being angled with respect to the longitudinal axis of the framework and laterally spaced from the furrowing disk for concave-convex moving dirt loosened by said at least one furrowing disk away from vegetables within said ground;
   (d) at least one generally vertical unearthing disk having a concave working face for concave-convex uplifting vegetable bulbs from ground after said at least one earth moving disk has moved said vegetables away from said dirt; and
   (e) at least one substantially horizontal transfer disk for conducting said bulbs from said dirt and onto said framework, each of said disks being attached to said framework.

2. A vegetable digger in accordance with claim 1 wherein all of said disks have corresponding central hubs and are generally concave-convex.

3. A vegetable digger in accordance with claim 1 wherein said framework includes means for conducting said uplifted vegetable bulbs from said at least one transfer disk back toward the rear of said framework to be deposited onto said ground and means for separating substantially all of the dirt from said vegetables.

4. A vegetable digger in accordance with claim 3 wherein said at least one transfer disk is positioned adjacent to at least one pick-up conveyor, said at least one pick-up conveyor comprising means for transporting said vegetables towards the rear of said framework.

5. A vegetable digger in accordance with claim 1 wherein said framework is generally horizontal with respect to said ground and wherein said framework front comprises a bar which is generally perpendicular to said direction of forward movement.

6. A vegetable digger in accordance with claim 5 wherein each of said at least one furrowing disk and each of said at least one earth moving disks are adjustably attached both vertically and laterally to said front bar.

7. A vegetable digger in accordance with claim 5 wherein said framework sides comprise generally parallel bars which are generally perpendicular to said front bar and generally parallel to said direction of movement.

8. A vegetable digger in accordance with claim 7 wherein said furrowing disk is positioned forwardly of said earth moving disk, as viewed with respect to said direction of forward movement, said furrowing disk and said earth moving disks being located below and substantially angled with respect to a central axis of said framework and with respect to said parallel side bars.

9. A vegetable digger in accordance with claim 8 wherein there are two earth moving disks and wherein said unearthing disk is positioned along an axis which bisects an acute angle formed by said two earth moving disks.

10. A vegetable digger in accordance with claim 1 wherein said transfer disk is located generally transversely with respect to said unearthing disk, said transfer disk being positioned adjacent said unearthing disk.

11. A vegetable digger in accordance with claim 10 further comprising at least one pick-up conveyor having a first end and a second end, said pick-up conveyor being generally angled upwardly from said first end toward said second end, said second end being positioned adjacent said rear of said framework, said first end being positioned directly adjacent to said transfer disk.

12. A vegetable digger in accordance with claim 1 wherein each of said generally vertical disks rotate in a substantially vertical plane about the corresponding central hub as said framework is moved in said predetermined direction, said transfer disk being rotatable about the corresponding central hub in a substantially horizontal plane.

13. A vegetable digger in accordance with claim 1 wherein said at least one furrowing disk and said at least one earth moving disk are freely rotatable as said digger traverses said ground and wherein said at least one unearthing disk and said at least one transfer disk are driven by pneumatic motors.

14. A vegetable digger in accordance with claim 13 further comprising a transport conveyor positioned adjacent said second end of said pick-up conveyor and adjacent the rear of said framework, said transport conveyor having a central portion which is substantially horizontal and two end portions adjacent respective sides of said framework which are angled generally downwardly towards the ground.

15. A vegetable digger in accordance with claim 13 wherein said pick-up conveyor is a chain-link conveyor, said conveyor comprising links spaced from one another by a sufficient distance to permit dirt and debris to fall between said links onto said ground as said framework moves in said predetermined direction while retaining said vegetables thereon.

* * * * *

UNITED STATES PATENT AND TRADEMARK OFFICE
CERTIFICATE OF CORRECTION

PATENT NO. : 4,828,039

DATED : May 9, 1989

INVENTOR(S) : Dale GORDON

It is certified that error appears in the above-identified patent and that said Letters Patent is hereby corrected as shown below:

Column 3, line 38, please change "adjustable" to ---adjustably---.

Column 5, line 41, please change "overal" to ---overall---.

Signed and Sealed this

Twenty-ninth Day of October, 1991

Attest:

HARRY F. MANBECK, JR.

*Attesting Officer*   *Commissioner of Patents and Trademarks*